United States Patent
Kim

(10) Patent No.: US 10,293,707 B2
(45) Date of Patent: May 21, 2019

(54) METHOD FOR CONTROLLING DECELERATION OF VEHICLE USING DRIVING INFORMATION OF VEHICLE

(71) Applicants: Hyundai Motor Company, Seoul (KR); Kia Motors Corporation, Seoul (KR)

(72) Inventor: Do Hee Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 107 days.

(21) Appl. No.: 15/683,532

(22) Filed: Aug. 22, 2017

(65) Prior Publication Data

US 2018/0162234 A1 Jun. 14, 2018

(30) Foreign Application Priority Data

Dec. 13, 2016 (KR) .......................... 10-2016-0169972

(51) Int. Cl.
*B60L 15/20* (2006.01)
*B60L 7/12* (2006.01)
*B60L 7/18* (2006.01)

(52) U.S. Cl.
CPC ............. *B60L 15/2009* (2013.01); *B60L 7/12* (2013.01); *B60L 7/18* (2013.01); *B60W 2520/105* (2013.01); *Y02T 10/645* (2013.01); *Y02T 10/72* (2013.01); *Y02T 10/7275* (2013.01)

(58) Field of Classification Search
CPC .......... B60L 15/2009; B60L 7/18; B60L 7/12; Y02T 10/72; Y02T 10/645; Y02T 10/7275; B60W 2520/105
See application file for complete search history.

(56) References Cited

U.S. PATENT DOCUMENTS

| | | | |
|---|---|---|---|
| 5,927,425 A * | 7/1999 | Kusano | B60K 23/0808 180/248 |
| 8,005,602 B2 | 8/2011 | Bando et al. | |
| 9,702,349 B2 * | 7/2017 | Anderson | B60G 17/019 |

(Continued)

FOREIGN PATENT DOCUMENTS

| KR | 10-0867826 B1 | 11/2008 |
|---|---|---|
| KR | 10-1646369 B1 | 8/2016 |

*Primary Examiner* — Mussa A Shaawat
(74) *Attorney, Agent, or Firm* — Mintz Levin Cohn Ferris Glovsky and Popeo, P.C.; Peter F. Corless

(57) ABSTRACT

A method for controlling deceleration of a vehicle includes: controlling a feed forward torque output unit to output feed forward torque stored in a map table, which corresponds to a current velocity of the vehicle and a deceleration target velocity of the vehicle when a deceleration event for the vehicle occurs; outputting feedback torque corresponding to the deceleration target velocity based on a vehicle velocity difference; controlling an adjustment factor output unit to adjust an application ratio of the feed forward torque stored in the map table, which corresponds to the vehicle velocity difference and a residual distance up to the deceleration event; and controlling a final control torque output unit to calculate final control torque for decelerating the vehicle based on the output feed forward torque and feedback torque and the adjusted application ratio and output the calculated final control torque to a powertrain of the vehicle.

7 Claims, 10 Drawing Sheets

(56) References Cited

U.S. PATENT DOCUMENTS

| | | | | |
|---|---|---|---|---|
| 2010/0114447 A1* | 5/2010 | Moriki | ................... | B60K 6/442 |
| | | | | 701/74 |
| 2014/0229072 A1* | 8/2014 | Kang | ..................... | B62D 7/159 |
| | | | | 701/42 |
| 2014/0379246 A1* | 12/2014 | Rose | .................... | B60W 50/00 |
| | | | | 701/123 |
| 2018/0141540 A1* | 5/2018 | Kumazaki | ............. | B60W 10/04 |

* cited by examiner

FIG. 4

|  | | CURRENT VELOCITY | | | | | |
|---|---|---|---|---|---|---|---|
|  | | ... | 60 | 80 | 100 | 120 | 140 | ... |
| TARGET VELOCITY | ... | CONTROL TORQUE (CALIBRATION FUNCTION) | | | | | |
|  | 60 | | | | | | |
|  | 80 | 0 | 0 | -5 | -10 | -15 | -30 | ... |
|  | 100 | | | | | | |
|  | 120 | | | | | | |
|  | 140 | | | | | | |
|  | ... | | | | | | |

METHOD FOR CONTROLLING DECELERATION OF VEHICLE USING DRIVING INFORMATION OF VEHICLE

CROSS-REFERENCE TO RELATED APPLICATION

This application claims under 35 U.S.C. § 119(a) the benefit of Korean Patent Application No. 10-2016-0169972 filed in the Korean Intellectual Property Office on Dec. 13, 2016, the entire contents of which are incorporated herein by reference.

BACKGROUND

(a) Technical Field

The preset disclosure relates to a method for controlling a vehicle, more particularly, to a method for controlling deceleration of a vehicle using driving information of the vehicle.

(b) Description of the Related Art

Environmentally friendly vehicles include a fuel cell vehicle, an electric vehicle, a plug-in electric vehicle, and a hybrid vehicle, and generally have a motor for generating driving force.

The hybrid vehicle, which is one example of the environmentally friendly vehicle, uses both an internal combustion engine and a battery power. That is, the hybrid vehicle efficiently combines and uses motive power of the internal combustion engine and the motive power of the motor.

The hybrid vehicle may be constituted by the engine, the motor, an engine clutch controlling the motive power between the engine and the motor, a transmission, a differential gear device, a battery, a starter and generator starting the engine or generating power by an output of the engine, and wheels.

Further, the hybrid vehicle may be constituted by a hybrid control unit controlling all operations of the hybrid vehicle, an engine control unit controlling the operation of the engine, a motor control unit controlling the operation of the motor, a transmission control unit controlling the operation of the transmission, and a battery control unit controlling and managing the battery.

The battery control unit may be referred to as a battery management system. The starter and generator may also be referred to as an integrated starter & generator (ISG) or a hybrid starter & generator (HSG).

The hybrid vehicle may be driven in drive modes including an electric vehicle mode (EV mode) which is a pure electric vehicle mode using only the motive power of the motor, a hybrid electric vehicle mode (HEV mode) using rotary force of the motor as an auxiliary motive power while using the rotary force of the engine as a main motive power, and a regenerative braking mode collecting braking and inertia energy while driving by braking or inertia of the vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method for controlling deceleration of a vehicle using driving information of the vehicle, which can effectively control deceleration at a time when a deceleration event of the vehicle occurs.

An example embodiment of the present disclosure provides a method for controlling deceleration of a vehicle using driving information of the vehicle, including: controlling, by a control unit, a feed forward torque output unit to output feed forward torque stored in a map table, which corresponds to a current velocity of the vehicle and a deceleration target velocity of the vehicle when a deceleration event for the vehicle occurs; outputting, by the control unit, feedback torque corresponding to the deceleration target velocity based on a vehicle velocity difference which is a difference between the current velocity and the deceleration target velocity; controlling, by the control unit, an adjustment factor output unit to adjust an application ratio of the feed forward torque stored in the map table, which corresponds to the vehicle velocity difference and a residual distance up to the deceleration event; and controlling, by the control unit, a final control torque output unit to calculate final control torque for decelerating the vehicle based on the output feed forward torque and the feedback torque and the adjusted application ratio, and output the calculated final control torque to a powertrain of the vehicle.

The method may further include determining, by the control unit, whether the deceleration event for decelerating the vehicle occurs by receiving deceleration event information from a navigation apparatus of the vehicle.

In the case of an adjustment factor output by the adjustment factor output unit and to adjust the application ratio, as the residual distance increases and the vehicle difference increases, the application ratio of the feed forward torque may increase.

The control unit may control the feed forward torque to be output before outputting the feedback torque based on the adjustment factor output by the adjustment factor output unit and to adjust the application ratio and control the feed forward torque and the feedback torque to be mixed and used and thereafter, control the feedback torque to be output when the vehicle approaches a position corresponding to the deceleration event.

The final control torque may be calculated by the equation: $\alpha$*FF tq.+$(1-\alpha)$*FB tq., where the $\alpha$ may represent the adjustment factor output by the adjustment factor output unit and to adjust the application ratio, the FF tq. may represent the feed forward torque, and the FB tq. may represent the feedback torque.

The method may further include determining, by the control unit, whether the vehicle velocity difference is equal to or less than a reference vehicle velocity and whether the residual distance is equal to or less than a reference distance, wherein the vehicle velocity difference is not equal to or less than the reference vehicle velocity and the residual distance is not equal to or less than the reference distance, a step of controlling the calculated final control torque to be output to the powertrain of the vehicle is performed.

A non-transitory computer readable medium containing program instructions executed by a processor may include: program instructions that control a feed forward torque output unit to output feed forward torque stored in a map table, which corresponds to a current velocity of a vehicle and a deceleration target velocity of the vehicle when a deceleration event for the vehicle occurs; program instructions that output feedback torque corresponding to the deceleration target velocity based on a vehicle velocity difference which is a difference between the current velocity and the deceleration target velocity; program instructions that control an adjustment factor output unit to adjust an application ratio of the feed forward torque stored in the map table, which corresponds to the vehicle velocity difference and a residual distance up to the deceleration event; and program instructions that control a final control torque output unit to calculate final control torque for decelerating the vehicle based on the output feed forward torque and the feedback torque and the adjusted application ratio, and output the calculated final control torque to a powertrain of the vehicle.

According to an exemplary embodiment of the present disclosure, a method for controlling deceleration of a vehicle using driving information of the vehicle can precise control deceleration of the vehicle by appropriately mixing the advantages of open-loop control and closed-loop control. Further, in a situation in which the initial control entrance and initial control torque (deceleration torque) which may largely influence the drivability occurs, the feed forward control, which is the map table based open-loop control, may be performed so as to enable the calibration, and in later control in which the control torque (deceleration torque) to be generated is small, but precise control is required, the feedback control which is closed-loop control may be performed.

When a control target is an environmentally friendly vehicle, regenerative energy depending on generation of deceleration torque appropriate to a deceleration event can be recovered.

Further, the exemplary embodiment can be applied to velocity control (e.g., smart cruise control (SCC)) or active coasting control (active coasting control for determining the target velocity) for following the target velocity.

BRIEF DESCRIPTION OF THE DRAWINGS

A brief description of each drawing is provided in order to more sufficiently appreciate drawings used in a detailed description of the present disclosure.

FIG. 4 is a schematic diagram for describing a feed forward torque output unit illustrated in FIG. 3.

DETAILED DESCRIPTION OF THE EMBODIMENTS

Figure 1:
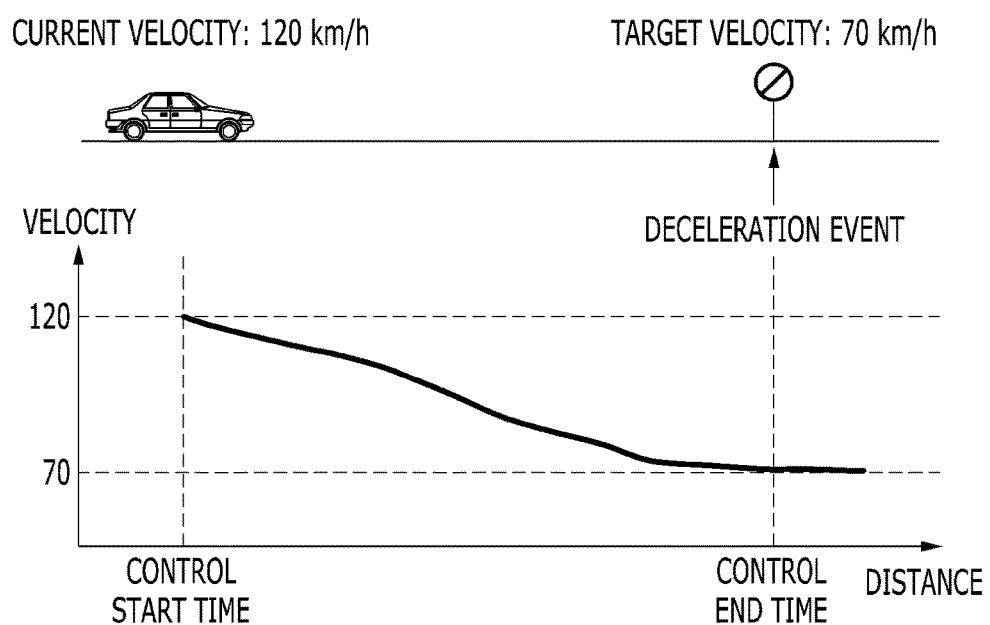
FIG. 1 is a schematic diagram for describing a method for controlling deceleration of a vehicle when a deceleration event occurs.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently appreciate objects achieved by the present disclosure and exemplary embodiments of the present disclosure, accompanying drawings illustrating the exemplary embodiments of the present disclosure and contents disclosed in the accompanying drawings should be referred.

Hereinafter, exemplary embodiments of the present disclosure will be described in detail by describing the present disclosure with reference to the accompanying drawings. In the following description, a detailed explanation of known related technologies may be omitted to avoid unnecessarily obscuring the subject matter of the present disclosure. Like reference numerals presented in each drawing may refer to like elements.

Terms used in the present specification are used only to describe specific exemplary embodiments, and are not intended to limit the present disclosure. A singular form may include a plural form if there is no clearly opposite meaning in the context. In the present specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Throughout the present specification and the claims that follow, when it is described that a part is "coupled" to another part, the part may be "directly coupled" to the other part or "electrically or mechanically coupled" to the other part through a third component.

When deceleration events (e.g., a tollgate, a velocity bump, a turning section, etc.) generated from driving path information such as a precise road map and global positioning system (GPS) positional information occur or in order to maintain a gap between vehicles for driving safety and enhancement of fuel efficiency of the vehicle, controlling deceleration of the vehicle is required. The precise road map information may represent a 3D map in which information on the road and surrounding geographical features with high accuracy. In particular, in an environmentally friendly vehicle capable of controlling the deceleration using a motor (alternatively, driving motor), precise feedback control needs to be performed.

FIG. 1 is a schematic diagram for describing a method for controlling deceleration of a vehicle when a deceleration event occurs.

Referring to FIG. 1, a vehicle which is driven at 120 km/h, for example, needs to perform smooth deceleration control in response to deceleration event information of 70 km/h which is a target velocity.

Figure 2:
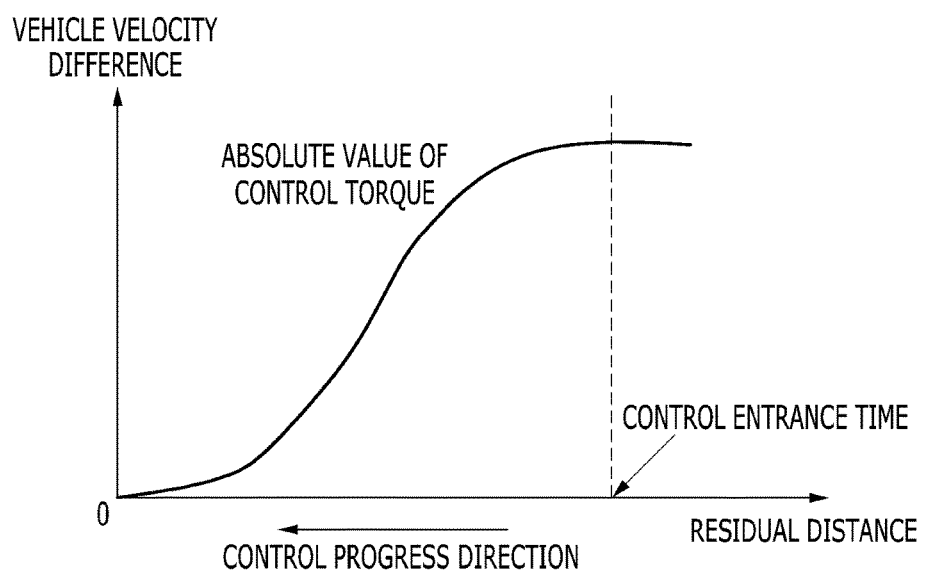
FIG. 2 is a graph for describing control torque when the deceleration control of the vehicle is performed.

FIG. 2 is a graph for describing control torque when the deceleration control of the vehicle is performed.

Referring to FIG. 2, an absolute value of control torque for deceleration needs to be reduced as a difference (that is, the current velocity of the vehicle—the target velocity of the vehicle) between the residual distance up to the deceleration event and the vehicle velocity decreases.

Figure 3:
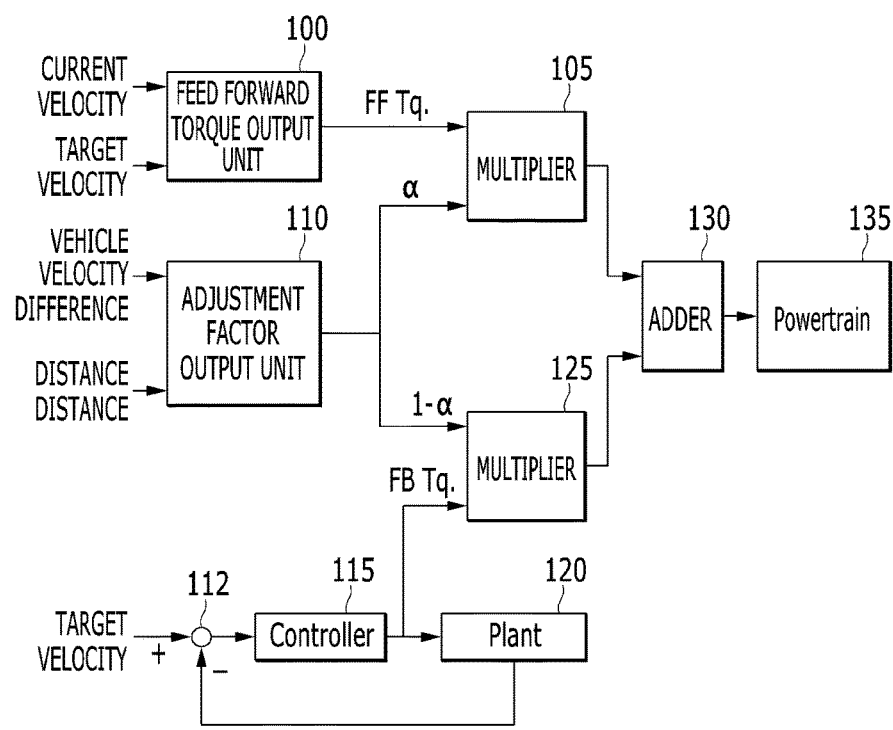
FIG. 3 is a block diagram for describing an apparatus for controlling deceleration of a vehicle using driving information of the vehicle according to an exemplary embodiment of the present disclosure.

FIG. 3 is a block diagram for describing an apparatus for controlling deceleration of a vehicle using driving information of the vehicle according to an exemplary embodiment of the present disclosure.

Referring to FIG. 3, the apparatus for controlling deceleration of a vehicle using driving information of the vehicle includes a feed forward torque output unit 100, a multiplier 105, an adjustment factor output unit 110, a subtractor 112, a controller (or a control unit) 115, a plant model 120 which is a control target model, a multiplier 125, an adder 130, and a powertrain 135 including a driving motor driving a driving wheel of the vehicle and a transmission. For example, the plant model 120 may be a vehicle model including the motor driving the environmentally friendly vehicle, and the like. The powertrain may include the engine selectively driving the vehicle.

The apparatus for controlling deceleration of a vehicle may perform map table (e.g., a memory) based feed forward control (alternatively, open-loop control) at the time of initially entering deceleration control so as to minimize a difference in driver's deceleration feeling (alternatively, drivability) by a driver depending on a transient reaction (transient response) of the vehicle. However, due to a characteristic of the control, when a drive situation not included (alternatively, not considered) in the map table occurs, accuracy of the control may be reduced. In the drive situation in which many disturbances occur, real-time reflection of the drive situation through the feedback control is required. As a result, in the exemplary embodiment of the present disclosure, dual loop deceleration control depending on a rule (relationship) between the residual distance and the vehicle velocity is performed to increase accuracy in following the target velocity.

FIG. 4 is a schematic diagram for describing a feed forward torque output unit illustrated in FIG. 3.

Referring to FIGS. 3 and 4, the feed forward torque output unit 100 may output feed forward torque FF Tq. stored in a map table, which corresponds to a current velocity of the vehicle and a deceleration target velocity of the vehicle. The control unit 115 may calculate the deceleration target velocity by receiving deceleration event information (e.g., tollgate positional information, velocity bump positional information, turning section information, etc.,) from a navigation apparatus.

Figure 5:
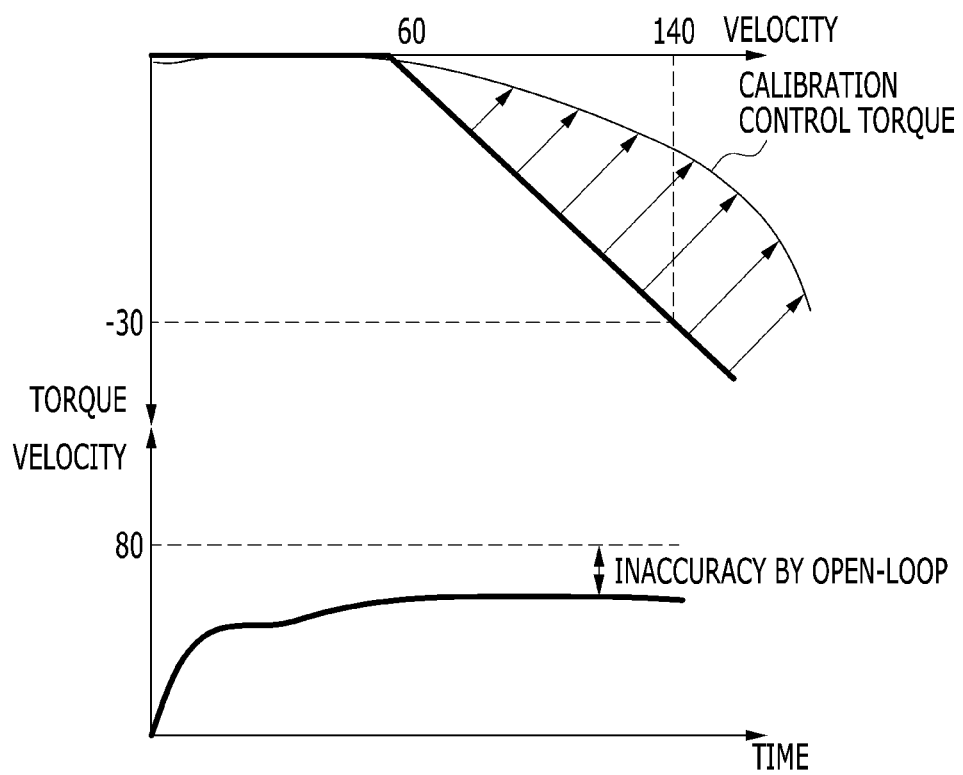
FIG. 5 is a graph for describing calibration of the feed forward torque output from the feed forward torque output unit illustrated in FIG. 3.

FIG. 5 is a graph for describing calibration of the feed forward torque output from the feed forward torque output unit illustrated in FIG. 3.

Referring to FIGS. 3, 4, and 5, the feed forward torque as control torque stored in the map table may be calibrated (alternatively, corrected) when drivability (deceleration feeling) is considered. When additionally described, the drivability (driver's feeling) which is non-linear, uncertain, and is difficult to model is calibrated based on the test and an experience to comparatively easily determine an output of the feed forward torque. However, as illustrated in FIG. 5, in terms of the open-loop control, the feed forward torque determined in advance may be inaccurate.

Figure 6:
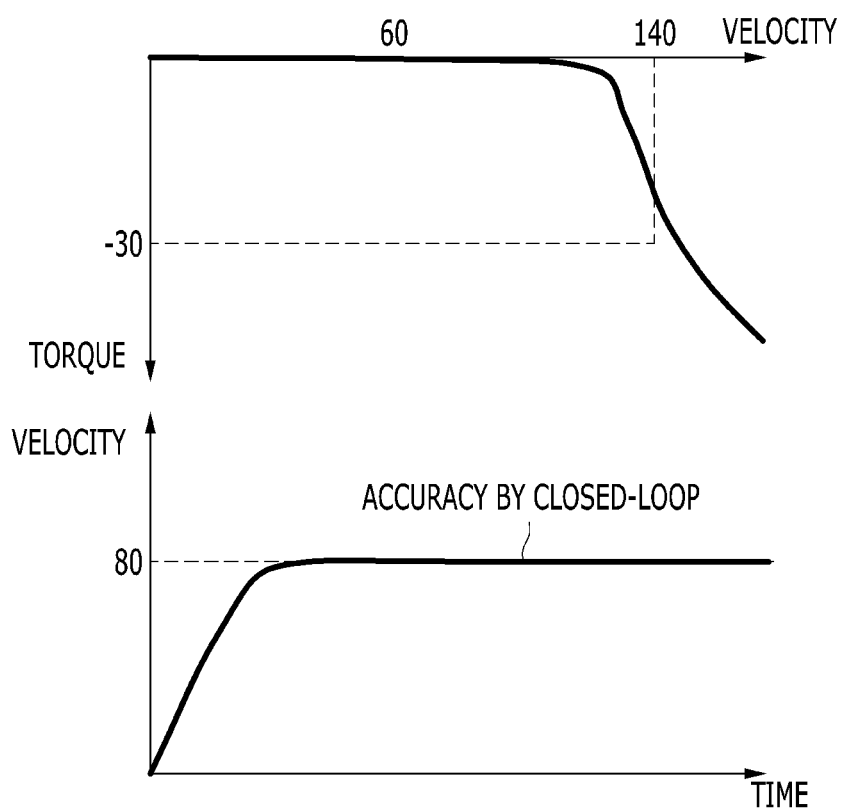
FIG. 6 is a graph for describing a control unit outputting feedback torque illustrated in FIG. 3.

FIG. 6 is a graph for describing a control unit outputting feedback torque illustrated in FIG. 3.

Referring to FIGS. 3 and 6, the control unit 115 may output feedback torque FB Tq. corresponding to the deceleration target velocity by using the plant model 120 and the subtractor 112.

The feedback torque as the control torque may be calculated by an equation given below.

$$m\dot{v}=F_u-F_r$$

In the equation, $F_u$ may represent the feedback torque and $F_r$ may represent disturbance model torque considering air resistance, friction force, or gravity. The control unit 115 may determine the feedback torque based on the plant model 120 such that the current velocity of the vehicle, which is output from the plant model 120 follows the target velocity.

As illustrated in FIG. 6, since a non-linear feature (element) such as the drivability is excluded from the plant model 120, the feedback torque may rapidly follow the target regardless of the drivability.

Figure 7:
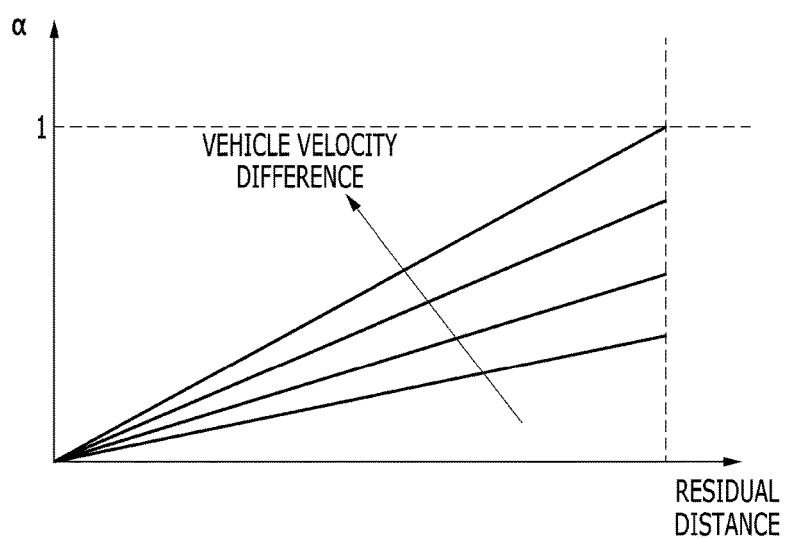
FIG. 7 is a graph for describing an adjustment factor output unit illustrated in FIG. 3.
Figure 8:
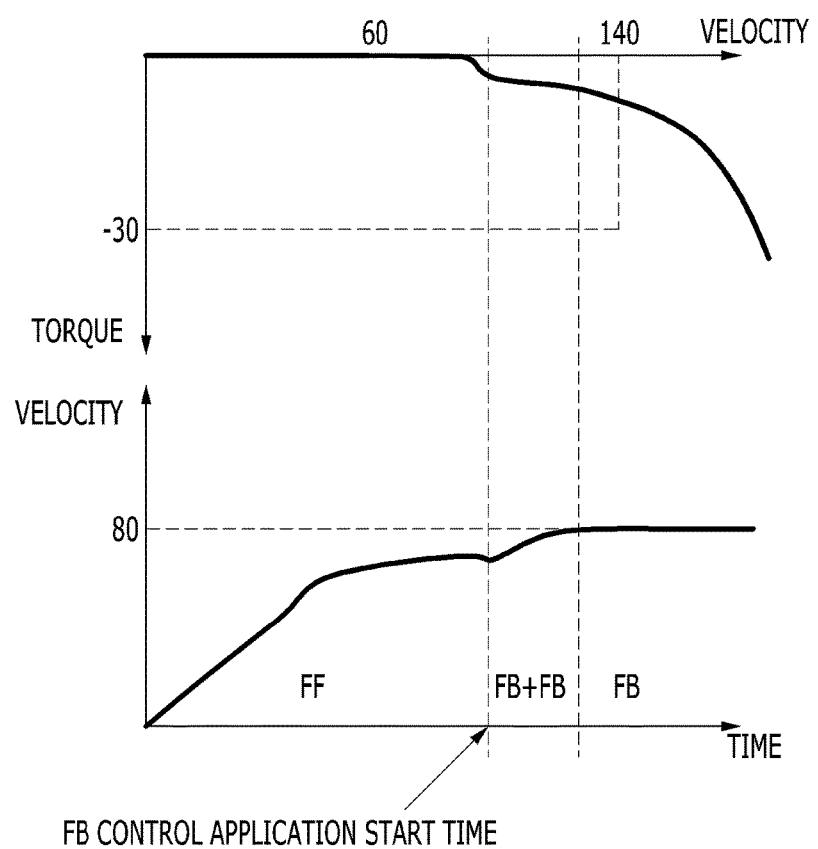
FIG. 8 is a graph for describing an adjustment factor illustrated in FIG. 7 is applied.

FIG. 7 is a graph for describing an adjustment factor output unit illustrated in FIG. 3. FIG. 8 is a graph for describing an adjustment factor illustrated in FIG. 7 is applied.

Referring to FIGS. 3, 7, and 8, the adjustment factor output unit 110 may output an adjustment factor α to adjust an application weight (application ratio) of the feed forward torque stored in the map table, which corresponds to the vehicle velocity difference and the residual distance. As a residual distance increases and a vehicle velocity difference increases, the weight (ratio) occupied by the feed forward torque in the control torque may increase.

Referring to FIG. 3, in order to achieve the control torque depending on occurrence of the deceleration event and maximize the advantages of the feed forward (FF) control and the feedback (FB) control, the adjustment factor output unit 110 may adjust the application ratio of the feed forward (FF) torque and the feedback (FB) torque according to a feature (characteristic) of each control and the multiplier 105, the multiplier 125, and the adder 130 may output the final control torque for deceleration of the vehicle to the powertrain 135. For example, the final control torque may be calculated by α*FF tq.+(1−α)*FB tq. The powertrain 135 may drive (decelerate) the vehicle in response to the final control torque.

As described above, as the deceleration event occurs, the coasting drive control needs to be performed (progressed) by using the driving motor regardless of a will of the driver, and as a result, feed forward (FF) control to enable calibration considering the drivability in a situation in which the drivability (driver's feeling) may be influenced and feedback (FB) control may be used for improvement of following precision at a distance close to the target velocity. Therefore, in the exemplary embodiment of the present disclosure, when the deceleration event occurs, the current velocity of the vehicle may enter the target velocity without influencing the drivability.

Figure 9:
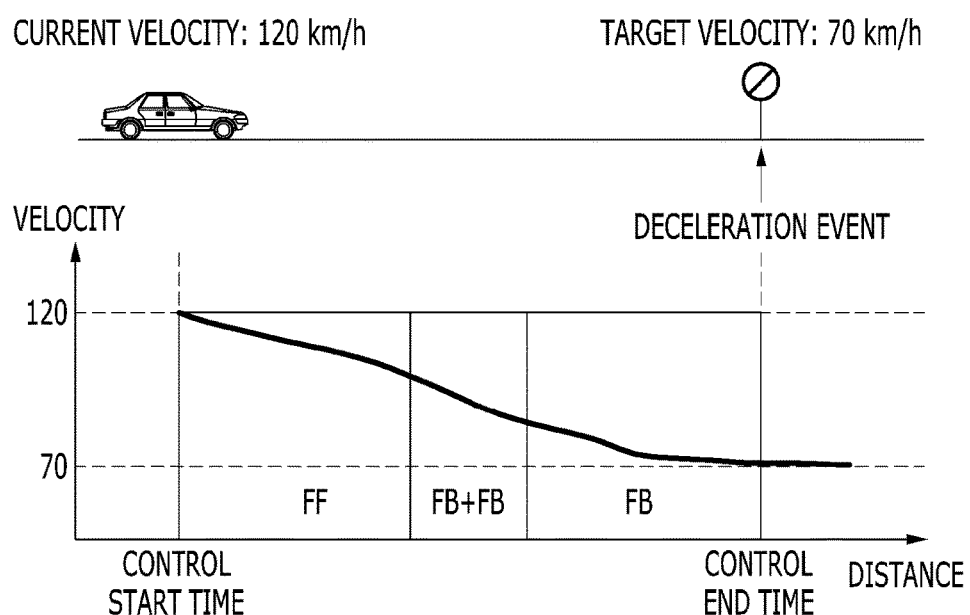
FIG. 9 is a schematic diagram for describing vehicle control performed by the apparatus for controlling deceleration of a vehicle illustrated in FIG. 3.

FIG. 9 is a schematic diagram for describing vehicle control performed by the apparatus for controlling deceleration of a vehicle illustrated in FIG. 3.

Referring to FIG. 9, in the dual loop control according to the exemplary embodiment of the present disclosure, the difference between the target vehicle velocity and the current vehicle velocity may be reduced by starting with the feed forward (FF) control, and as the deceleration event is approached, the feed forward (FF) control and the feedback (FB) control are used (mixed or overlapped) to determine the control torque according to the adjustment factor to determine the weights of the feed forward (FF) control and the feedback (FB) control. Further, more precise control may be required, and the feedback (FB) control may be performed at a distance around the target point corresponding to the deceleration event.

Figure 10:
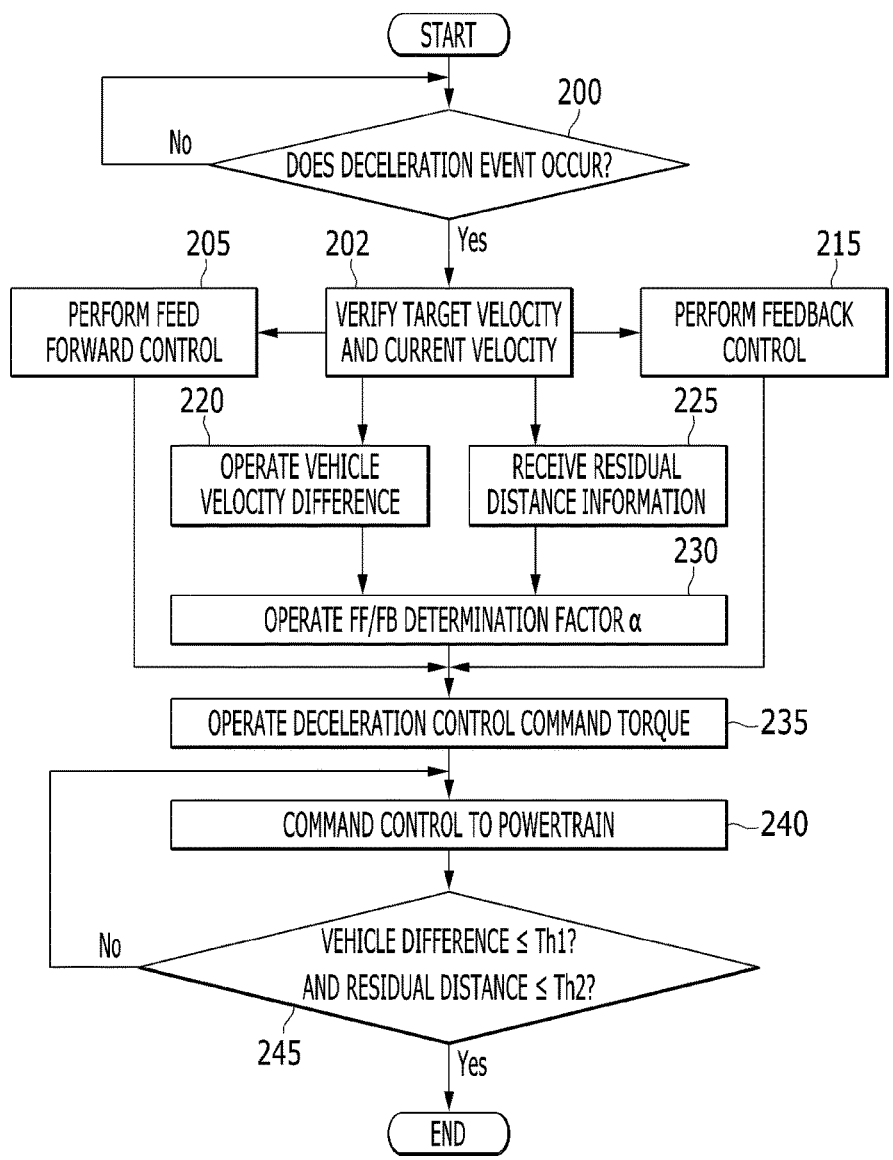
FIG. 10 is a flowchart for describing a method for controlling deceleration of a vehicle using driving information of the vehicle according to an exemplary embodiment of the present disclosure.

FIG. 10 is a flowchart for describing a method for controlling deceleration of a vehicle using driving information of the vehicle according to an exemplary embodiment of the present disclosure. The method for controlling deceleration of a vehicle may be applied to the control apparatus illustrated in FIG. 3.

Referring to FIGS. 3 and 10, in a detection step (200), the control unit 115 receives the deceleration event information from the navigation apparatus of the vehicle to determine whether the deceleration event for decelerating the vehicle occurs. The control unit 115 may be, for example, one or more microprocessors which operate by a program or hardware including the microprocessors and the program may include a series of instructions for performing a method for controlling deceleration of a vehicle using driving information of the vehicle according to an exemplary embodiment of the present disclosure, which is described below. The control unit 115 may control all operations of the environmentally friendly vehicle including the apparatus for controlling deceleration of a vehicle.

According to a verification step (202), the control unit 115 may verify (calculate) the target velocity for decelerating the vehicle by using the deceleration event information and verify (calculate) the current velocity of the vehicle by using a sensor such as a velocity sensor installed in the vehicle.

According to a control step (205), the control unit 115 may control the feed forward torque output unit 100 to output the feed forward torque stored in the map table, which corresponds to the current velocity of the vehicle and the deceleration target velocity of the vehicle.

According to a control step (215), the control unit 115 may output the feedback torque corresponding to the deceleration target velocity based on a vehicle velocity difference which is a difference between the current velocity and the deceleration target velocity.

According to an operation step (220), the control unit 220 may calculate the vehicle velocity difference based on the current velocity and the target velocity.

According to a receiving step (225), the control unit 220 may receive the residual distance up to the deceleration event from the navigation apparatus or calculate the residual distance based on the current velocity and the target velocity.

According to an operation step (230), the control unit 115 may control the adjustment factor output unit 110 to output a factor α to adjust an application weight (application ratio) of the feed forward torque stored in the map table, which corresponds to the vehicle velocity difference and the residual distance.

According to an operation step (235), the control unit 115 may control the multiplier 105, the multiplier 125, and the adder 130 which may be included in the final control torque output unit to calculate the final control torque (alternatively, deceleration control command torque) for decelerating the vehicle by using the output the feed forward torque and feedback torque and the adjustment factor α. For example, the final control torque may be calculated by α*FF tq.+(1−α)*FB tq.

According to a command step (240), the control unit 115 may control the adder 130 to output the final control torque to the powertrain 135.

According to a comparison step (245), the control unit 115 may determine whether the vehicle velocity difference is equal to or less than a reference vehicle velocity Th1 and whether the residual distance is equal to or less than a reference distance Th2. When the vehicle velocity difference is not equal to or less than the reference vehicle velocity Th1 and the residual distance is not equal to or less than the reference distance Th2, the method for controlling deceleration of the vehicle, which is a process, may proceed to the command step (240).

A component, "unit", or block or module used in the exemplary embodiment of the present disclosure may be implemented as software such as a task, a class, a sub routine, a process, an object, an execution thread, and a program performed in a predetermined area on the memory or hardware such as field programmable gate array (FPGA) or application-specific integrated circuit (ASIC) and further, may be achieved by combining the software and the hardware. The component or 'unit' may be included in a computer readable storage medium and some of the component or 'unit' may be dispersively distributed.

As described above, the exemplary embodiments are disclosed in the drawings and the specification. Herein, specific terms are used, but this is just used for the purpose of describing the present disclosure, but not used for limiting a meaning or restricting the scope of the present disclosure disclosed in the claims. Therefore, it will be appreciated by those skilled in the art that various modifications and exemplary embodiments equivalent thereto can be made therefrom. Accordingly, the true technical scope of the present disclosure should be defined by the technical spirit of the appended claims.

What is claimed is:

1. A method for controlling deceleration of a vehicle using driving information of the vehicle, the method comprising:
controlling, by a control unit, a feed forward torque output unit to output feed forward torque stored in a map table, which corresponds to a current velocity of the vehicle and a deceleration target velocity of the vehicle when a deceleration event for the vehicle occurs;

outputting, by the control unit, feedback torque corresponding to the deceleration target velocity based on a vehicle velocity difference which is a difference between the current velocity and the deceleration target velocity;

controlling, by the control unit, an adjustment factor output unit to adjust an application ratio of the feed forward torque stored in the map table, which corresponds to the vehicle velocity difference and a residual distance up to the deceleration event; and controlling, by the control unit, a final control torque output unit to calculate final control torque for decelerating the vehicle based on the output feed forward torque and the feedback torque and the adjusted application ratio, and output the calculated final control torque to a powertrain of the vehicle.

2. The method of claim 1, further comprising:

determining, by the control unit, whether the deceleration event for decelerating the vehicle occurs by receiving deceleration event information from a navigation apparatus of the vehicle.

3. The method of claim 1, wherein:

in the case of an adjustment factor output by the adjustment factor output unit and to adjust the application ratio, as the residual distance increases and the vehicle difference increases, the application ratio of the feed forward torque increases.

4. The method of claim 1, wherein:

the control unit controls the feed forward torque to be output before outputting the feedback torque based on an adjustment factor output by the adjustment factor output unit and to adjust the application ratio and controls the feed forward torque and the feedback torque to be mixed and used and thereafter, controls the feedback torque to be output when the vehicle approaches a position corresponding to the deceleration event.

5. The method of claim 1, wherein:

the final control torque is calculated by the equation: $\alpha*FF$ tq.$+(1-\alpha)*FB$ tq., wherein the $\alpha$ represents the adjustment factor output by the adjustment factor output unit and to adjust the application ratio, the FF tq. represents the feed forward torque, and the FB tq. represents the feedback torque.

6. The method of claim 1, further comprising:

determining, by the control unit, whether the vehicle velocity difference is equal to or less than a reference vehicle velocity and whether the residual distance is equal to or less than a reference distance, wherein the vehicle velocity difference is not equal to or less than the reference vehicle velocity and the residual distance is not equal to or less than the reference distance, a step of controlling the calculated final control torque to be output to the powertrain of the vehicle is performed.

7. A non-transitory computer readable medium containing program instructions executed by a processor, the computer readable medium comprising:

program instructions that control a feed forward torque output unit to output feed forward torque stored in a map table, which corresponds to a current velocity of a vehicle and a deceleration target velocity of the vehicle when a deceleration event for the vehicle occurs;

program instructions that output feedback torque corresponding to the deceleration target velocity based on a vehicle velocity difference which is a difference between the current velocity and the deceleration target velocity;

program instructions that control an adjustment factor output unit to adjust an application ratio of the feed forward torque stored in the map table, which corresponds to the vehicle velocity difference and a residual distance up to the deceleration event; and program instructions that control a final control torque output unit to calculate final control torque for decelerating the vehicle based on the output feed forward torque and the feedback torque and the adjusted application ratio, and output the calculated final control torque to a powertrain of the vehicle.

* * * * *